April 8, 1958

S. A. SCHERBATSKOY 2,830,187

RADIATION DETECTOR

Filed Jan. 22, 1954

INVENTOR.

Serge A Scherbatskoy

April 8, 1958  S. A. SCHERBATSKOY  2,830,187
RADIATION DETECTOR
Filed Jan. 22, 1954  2 Sheets-Sheet 2

INVENTOR.
Sage A Scherbatskoy

United States Patent Office 2,830,187
Patented Apr. 8, 1958

2,830,187

RADIATION DETECTOR

Serge A. Scherbatskoy, Tulsa, Okla.

Application January 22, 1954, Serial No. 405,547

1 Claim. (Cl. 250—71)

This application is a continuation-in-part of the U. S. patent application Serial No. 305,431 filed on August 20, 1952, by Serge A. Scherbatskoy.

This invention is concerned with a radiation detector and method and apparatus for performing measurements in a bore hole of radiations resulting from nuclear transformations within the formations adjoining said hole, said nuclear transformations being either spontaneous and caused by natural radioactivity or induced and caused by an external agent such as a source of neutrons placed adjacent to said formations in the neighborhood of the detecting instrument.

Many measurements have been made of the above radiations, and particularly gamma radiations. These gamma radiations usually result from natural radioactive substances present in the formations or from the effect of irradiation of the formations with the stream of neutrons. The measurement of these radiations has been found useful in geophysical prospecting and in many instances the measurement of the radiations obtained from a geological formation has yielded valuable information as to the nature of the formation. Thus to cite an example, a radiation detector either alone or accompanied with a source of neutrons has been lowered into a bore hole in the earth and measurements were made at various levels of gamma radiations derived from the formation.

In the above arrangements, the radiation detector was exposed to radiations arriving from all the directions within the bore hole. Therefore the amount of radiation detected was indicative of the nature of the formation located not only at the level of the instrument, but also above and below said level. It is desirable therefore to have more specific information about the radiation obtained from the particular formation located at the level of the detector and to eliminate the extraneous effects caused by formations located above and below said particular formation.

This invention is therefore concerned with a method and apparatus for selectively receiving and measuring only those radiations that arrive laterally from the formations located at the same level as the detector. These measurements when correlated with the measurements of the depth at which they were taken have shown accurately the interfaces between the various strata and have given good indications of the nature of particular strata.

It is an object of the present invention to provide an improved method and improved apparatus for determining the character of unknown substances adjacent a bore hole.

It is another object of the present invention to provide an improved method and improved apparatus for selectively receiving the gamma radiations that arrive laterally from the adjoining formations at various depths within the drill hole.

For further details of specific devices embodying the principles of this invention and for a more complete understanding of the mode of application of the principles of this invention and the numerous advantages thereof, reference may be made to the accompanying drawings in which.

Figure 1A:
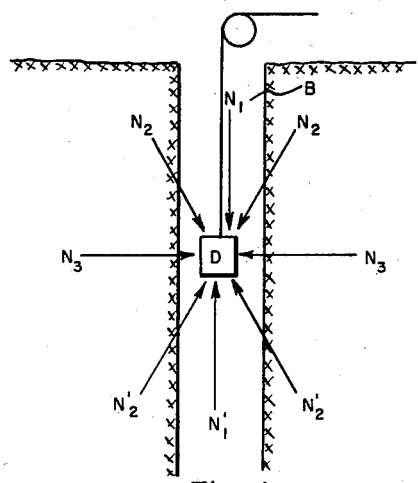
Fig. 1a shows schematically the multidirectional reception of radiation as practiced in the prior art.
Figure 1B:
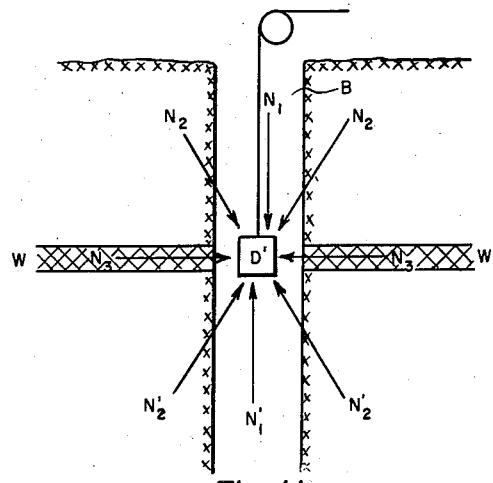
Fig. 1b shows schematically the unidirectional reception of radiation as proposed in the present invention.

Referring now to the drawings and particularly to Fig. 1a, a detector D lowered into the bore hole B is subjected to radiations that arrive from all directions (as shown by the arrows $N_1$, $N_2$, $N_3$, $N^1_2$, and $N^1_1$), and accordingly we obtain a measurement of the total intensity of said radiation. On the other hand, the detector $D^1$ shown in Fig. 1b is of a directional type, i. e. it is arranged to selectively receive the radiations that arrive laterally along the directions represented by the arrows $N_3$ and has a very low sensitivity to radiations incoming from other directions represented by the arrows $N_2$, $N_1$, $N^1_2$, and $N^1_1$. The directional reception of the type shown in Fig. 1a is illustrated in detail in Figs. 2, 3, 4, and 5.

The radiation detectors illustrated herein are of scintillation counter type and comprise a crystal in combination with a photomultiplier. The crystal is adapted to convert the incoming gamma rays into impulses of light which subsequently impinge upon the corresponding photomultiplier provided with a suitable voltage supply. We obtain thus across the output terminals of such detector current impulses which coincide with the arrival of gamma rays.

Figure 2:
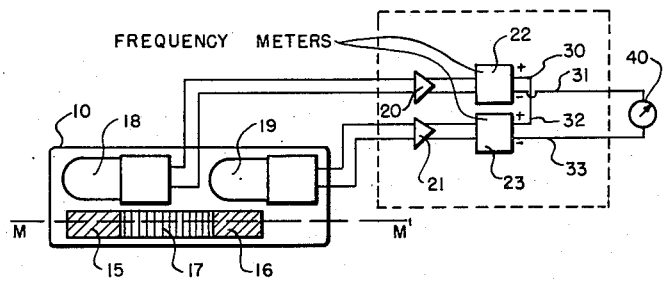
Fig. 2 shows diagrammatically a directional radiation counter embodying the principles of the present invention.

Referring now to Fig. 2, the directional gamma ray detector shown therein is enclosed within a suitable container 10 and comprises as its essential elements two sodium iodide crystals 15, 16 and a tungsten shield 17 interposed therebetween. The crystals and the shield are aligned along a direction $M—M^1$ which we shall designate as the axis of the directional detector. In the immediate proximity of the crystal 15 is positioned a photomultiplier provided with suitable voltage supply, the combined photomultiplier and voltage supply being designated by the block 18. Similarly, a combined photomultiplier and voltage supply designated by block 19 is positioned adjacent to the crystal 16.

The outputs of the photomultipliers 18, 19 are fed through the amplifiers 20, 21 into the frequency meters 22, 23. The frequency meters are of standard construction and adapted to produce outputs representing frequencies of impulses derived from the amplifiers 20, 21, respectively. The frequency meter 22 is illustrated as having positive terminal 30, negative terminal 31, and the direct current voltage appearing across these terminals represents the frequency of impulses derived from the photomultiplier 18. Similarly, the frequency meter 23 is illustrated as having a positive terminal 32, negative terminal 33, and the direct current voltage appearing across these terminals represents the frequency of impulses derived from the photomultiplier 19.

The outputs of frequency meters 22 and 23 are connected in opposition, i. e. the positive terminal 30 has the same polarity as the positive terminal 32. Consequently, the difference in the voltages at the terminals 31 and 33 is applied to a voltmeter 40 through the leads 41 and represents the difference between the frequency of impulses derived from photomultiplier 18 and the impulses derived from the photomultiplier 19.

Figure 3:
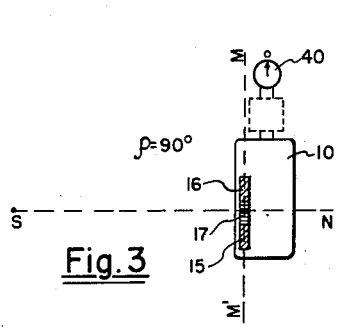
Fig. 3 shows the radiation counter of Fig. 2 oriented perpendicularly to the direction of the source.

Assume now that the detector as shown in Fig. 2 is exposed to gamma rays radiated by a source S. Fig. 3 shows an arrangement in which the detector is located in the neighborhood of a point N at a distance D from the source S and is oriented perpendicularly to the direction of the source, i. e. the axis of the counter $MM^1$ forms an angle $\delta = 90°$ with the direction NS of the source. For the clarity of illustration, the detector is not shown in full; only the crystals 15, 16 and shield 17 are illustrated in the drawing.

It is apparent that in the arrangement of Fig. 3 the crystal 15 is exposed to the same amount of radiation from the source S as the crystal 16. The crystals 15, 16 are adapted to convert the intercepted gamma rays into light impulses which subsequently impinge upon the photomultipliers 18, 19 which provide current impulses that are coincident with gamma rays that are intercepted by the crystals 15 and 16, respectively. Since the radiation intercepted by the crystal 15 is equal in intensity to radiation intercepted by the crystal 16, the outputs of photomultipliers 18, 19 have the same frequencies and the D. C. voltage $V_1$ across the terminals of the frequency meter 22 is equal to the D. C. voltage $V_2$ across the terminals of the frequency meter 23. Since these two D. C. voltages oppose each other, the resultant voltage indicated on the meter 40 is:

$$V_{90°} = V_1 - V_2 = 0$$

It is thus apparent that when the angle $\delta$ between the orientation of the detector and the direction of the source is 90 degrees the meter 40 indicates zero.

Figure 4:
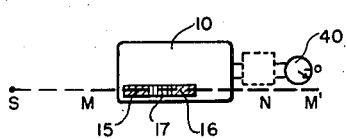
Fig. 4 shows the radiation counter of Fig. 2 aligned along the direction of the source.

Consider now Fig. 4 in which the directional counter positioned at the distance D from the source is oriented along the direction of the source. The axis $MM^1$ coincides with the direction SN of the source, i. e. $\delta=0$: In this arrangement the number of gamma ray photons intercepted by the crystal 15 is the same as in case of Fig. 2 and consequently the voltage across the terminals of the frequency meter 22 is $V_1$, i. e. it is the same in Fig. 3 and Fig. 4. However, the flux of gamma rays radiated by the source S and impinging upon the crystal 16 has to traverse the crystal 15 and the tungsten shield 17. Since the crystal 16 and the shield 17 attenuate a considerable amount of incoming radiation, the intensity of the rays impinging upon the crystal 16 is considerably smaller in the arrangement of Fig. 4 than in Fig. 3. Consequently, the voltage $V_2$ across the terminals of the frequency meter 23 is considerably smaller than the voltage across the terminals of the frequency meter 22. Since these two voltages oppose each other, the resultant voltage shown on the meter 40 will have a relatively large value which we shall designate as $$V_0 = V_1 - V_2^1$$

Figure 5:
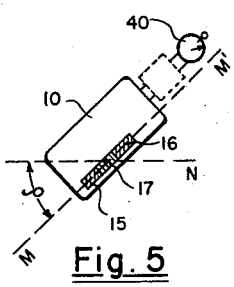
Fig. 5 shows the radiation counter of Fig. 2 oriented along the direction forming an angle $\delta$ with the direction of the source.

Consider now Fig. 5 in which the directional counter positioned at the distance D from the source is oriented in such a manner that its axis MM, forms an arbitrary angle $\delta$ with the direction SN of the source S, such that $0 < \delta < 90°$. In this arrangement the crystal 15 is exposed to the same amount of radiation from the source S as in Figs. 3 and 4 and consequently the voltage $V_1$ across the output terminals of the frequency meter 22 is the same as in Figs. 3 and 4. However, the flux of gamma rays radiated by the source S and impinging upon the crystal 16 is attenuated less effectively than in case of Fig. 3. In Fig. 3 the attenuation was maximum because the shield 17 is interposed in the entire direct path from the source to the crystal 16. In Fig. 4, however, only a portion of the direct path from the source S to the crystal 16 is shielded by the shield 17 and the remaining portion of the direct path is in air. Consequently the flux of gamma rays impinging upon the crystal 16 is larger in Fig. 5 than in Fig. 4, but is smaller in Fig. 5 than in Fig. 3. Thus the voltage $V_2^{11}$ across the terminals of the frequency meter 23 is larger than $V_2^1$ in Fig. 4, but is smaller than $V_2$ in Fig. 3. The differential voltage $V_i$ indicated on the meter 40 is $(V - V_2^{11})$. The value $V^i$ is smaller than $V_0$ and larger than $V_{90°}$.

Figure 6:
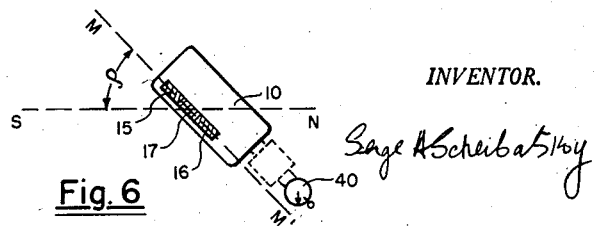
Fig. 6 shows the radiation counter of Fig. 2 oriented along the direction forming an angle $-\delta$ with the direction of the source.

It is thus apparent that varying the orientation of the axis $MM^1$ of the counter from $\delta=0$ (as shown on Fig. 3) to $\delta=90°$ as shown on Fig. 3 the indication of the meter 40 decreases from $V_0$ to zero and passes through a series of intermediate values $V_i$ such as shown in Fig. 5. It is also apparent that the response of the meter for the angle $-\delta = 360° - \delta$ is the same as for $\delta$ (see Fig. 6). A curve showing the dependence of $V_i$ on $\delta$ is shown in Fig. 7.

Figure 7:
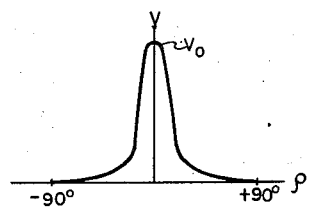
Fig. 7 shows the relationship between the orientation of the counter of Fig. 2 and the indication provided by the counter.

From the inspection of Fig. 7, it is apparent that if we rotate the directional counter, i. e. if we vary continuously the value $\delta$ the indication of the meter 40 will correspondingly vary and will assume a maximum value $V_0$ when $\delta=0$, i. e. when the counter is oriented in the direction of the source.

Figures 8, 9:
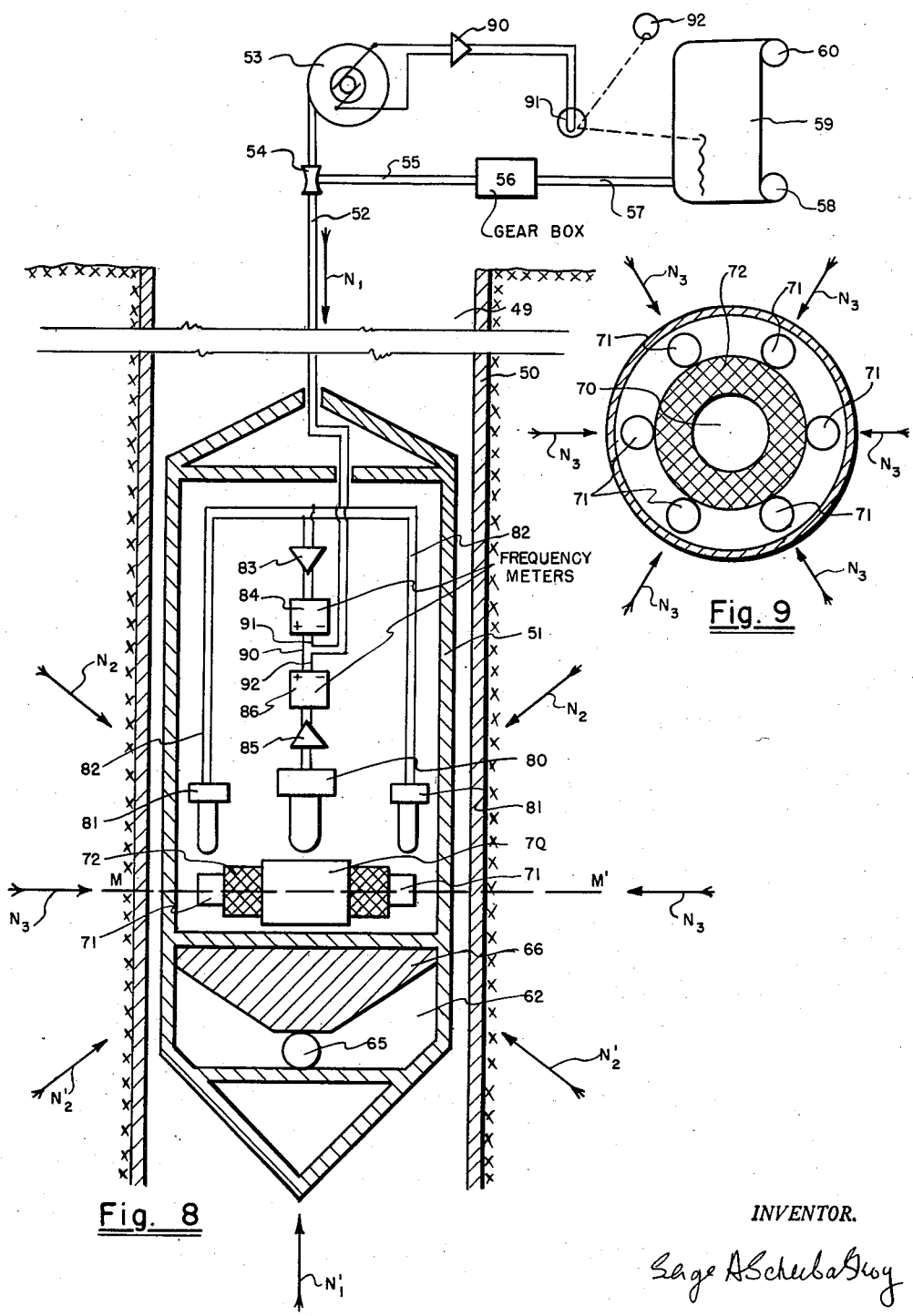
Fig. 8 illustrates diagrammatically a bore hole which penetrates the strata of the earth, a subsurface instrument for lowering into said bore hole for directional reception of radiations from the adjoining formation and a recorder on the earth's surface for recording said radiations.
Fig. 9 illustrates diagrammatically the lateral cross section of the subsurface instrument shown in Fig. 8.

The principles of directional reception embodied in Figs. 2, 3, 4, 5 are applied to a well logging instrument shown in Figs. 8 and 9. Referring now more particularly to Fig. 8, a drill hole 19 is shown penetrating the formation to be explored. The drill hole is provided with a tubular metallic casing such as designated by 50.

The exploratory apparatus proper consists of a housing 51 which is lowered into the bore hole by means of a cable 52, containing insulated conductors. The cable has a length somewhat in excess of the length of the hole to be explored and is normally wound on a drum 53 positioned adjacent to the top of the drill hole. The cable may be unwound from the drum 53 to lower the exploring apparatus into the hole and may be rewound upon the drum to raise the exploring apparatus. Between the drum 53 and the hole there is a measuring reel 54 which is adjusted to roll on the cable in such a manner that the number of revolutions of the reel corresponds to the amount of cable which has passed up or down in the drill hole. The reel is mounted on a shaft 55, and the motion of the shaft is transmitted through a gear box 56 to another shaft 57 which turns a spool 58 to wind a photographic film 59, the film being supplied from a feed spool 60.

The housing 51 of the exploratory apparatus comprises two partitions designated by numerals 62 and 63, respectively. In the partition 62 there is provided upon a solid support an appropriate source of neutrons 65 such, for example, as a radium-beryllium preparation, which may be enclosed in a container made of a suitable material such as glass. Instead of radium-beryllium preparation, the source of neutrons may comprise, for example, a discharge tube adapted to bombard a beryllium or lithium composition with deuterons, thus causing a generation of neutrons in a manner understood in the art.

The radiations transmitted from 65 tend to propagate themselves in all directions. I have provided, however, an absorbing block 66 formed of materials, for example, such as lead and paraffin which is relatively opaque to penetrating radiations, the paraffin being relatively opaque to neutrons and the lead being relatively opaque to other radiations. I have therefore prevented a direct path between 65 and the detecting instrument positioned above the block 66. Consequently, the radiations emitted from 65 are directed sideways into the adjoining formations and the amount of radiations going upwards through the absorbing block is negligible.

In the partition 63 there is provided the detector (shown in horizontal cross section MM¹ in Fig. 9) for directionally receiving the radiations from the neighboring formations. The detector comprises a sodium iodide crystal 70 arranged centrally, and six sodium iodide crystals 71 surrounding the crystal 70. The effective volume of the crystal 70 is arranged to be equal to the total effective volume of the crystals 71. Suitable toroidal shield 72 made of tungsten is interposed between the crystals 71 and the central crystal 70. In the immediate proximity of the crystal 70 is positioned a photomultiplier provided with a suitable voltage supply, the combined photomultiplier and voltage supply being designated as 80. Similarly, a combined photomultiplier and voltage supply designated by 81 is positioned adjacent to each crystal 71.

The outputs of the photomultipliers 81 are connected in parallel by means of leads 82 and applied through the amplifier 83 to the frequency meter 84. Similarly, the output of the photomultiplier 80 is connected through the amplifier 85 to the frequency meter 86.

The outputs of frequency networks 84 and 86 are connected in opposition, i. e. their positive terminals of said meters are connected by means of a lead 90. Consequently the difference of potential between the negative terminals of these meters designated as 91 and 92 represents the difference between the frequency of impulses derived from the peripheral photomultipliers 81 and the impulses derived from the central photomultiplier 80. The voltage obtained from the terminals 91 and 92 is transmitted through insulated conductors associated with the cable 52 to the top of the drill hole. This voltage is subsequently amplified in amplifier 90 located above the opening to the bore hole and is connected to the galvanometer coil 91. The galvanometer coil has attached thereto a suitable mirror in a manner well known to those skilled in the art and is adapted to reflect a beam of light derived from a source 92, thereby effectively producing on the sensitive film 19 a record comprising a trace representing the variations of the voltage applied to the coil 91.

In order to determine the directional properties of the crystal assembly shown in Figs. 8 and 9, we shall consider separately the response of the detector to the radiation emitted from various directions designated as $N_1$, $N_2$, $N_3$, $N^1_2$, and $N^1_1$. The horizontal plane MM¹ shall be designated as the "plane of alignment" of the detector.

For the radiations arriving along the direction $N_1$ or $N^1_1$, i. e. perpendicularly to the plane of alignment MM¹, the situation is similar to that illustrated in Fig. 3. The central crystal 70 is exposed to the same amount of radiation as all the peripheral crystals 71. Since the effective volume of crystal 70 is equal to the total effective volume of all crystals 71, the number of photons intercepted by the crystal 70 is equal to the number of photons intercepted by all the crystals 71. Consequently, the frequency of current impulses derived from the amplifier 85 is the same as the corresponding frequency derived from the amplifier 83 and the voltage outputs of the networks 86 and 84 are the same. Since these voltages are arranged to be in opposition, the resulting voltage across the terminals 91, 92 is zero and therefore no signal is transmitted to the top of the drill hole. It is thus apparent that the detecting instrument is insensitive to radiation arriving along a perpendicular to its plane of alignment.

For radiations arriving along the direction $N_3$ parallel to the plane of alignment, the situation is similar to that shown in Fig. 4. In this case the number of gamma ray photons intercepted by all the peripheral crystals 71 is larger than the corresponding number of photons intercepted by the central crystal 70. This inequality is caused mainly by the tungsten shield 72 interposed between the peripheral crystals and the central crystal. This shield attenuates considerably the gamma ray flux that has already traversed the peripheral crystals and therefore the central crystal receives only a portion of said flux traversed. Consequently, the voltage output of frequency network 86 is considerably smaller than the voltage output of the frequency network 84. Since these two voltages are in opposition, the resultant voltage obtained across the terminals 91, 92 has a relatively large value. It is thus apparent that when the direction of the incoming flux is in the plane of alignment of the detector, the sensitivity of the detector to said radiation is relatively large.

For radiation arriving at the detector along the directions $N_2$ and $N^1_2$ inclined with respect to the plane of alignment of said detector, the situation is similar to that illustrated in Figs. 4 and 5. In this arrangement the attenuation caused by the shielding element 72 is less effective than in the case corresponding to $N_3$. In this case the number of photons intercepted by all the peripheral crystals 71 is larger than the corresponding number intercepted by central crystal 70. However, the difference between these two numbers is smaller than in the case of the radiation arriving along the directions $N_3$. Consequently the voltage between the terminals 91, 92 is smaller for the flux having directions $N_2$ when compared to the flux having direction $N_1$.

The diagram shown on Fig. 7 can also be used to represent the output of the detector shown in Figs. 8 and 9 for various directions of the incoming radiation. The abscissa represents the angle of inclination $\delta$ of the direction of incoming radiation with respect to the plane of alignment of the detector, i. e. $\delta=0$ for $N_3$; $\delta=90°$ for $N_1$; $\delta=-90°$ for $N^1_1$; $\delta=45°$ for $N=N_2$; $\delta=45°$ for $N=N^1_2$. The ordinates represent the voltage across the terminals 91, 92. It is apparent that the detector responds very selectively to the radiations arriving along the direction $N_3$ and shows little response to other radiation. The radiations having direction $N_3$ are produced mainly in the formation layer W (shown in Fig. 1a) directly adjacent to the detector. Consequently the detector is always responsive only to those radiations that are characteristic of the formation immediately adjacent thereto and located at the same level as the detector.

It is thus apparent that I have provided a nuclear well logging system by means of which we obtain indication representing the particular formation located at the level of the detector, said indication being free from any extraneous effects caused by formations located above and below said particular formation.

It will be obvious to those skilled in the art that numerous modifications other than those herein disclosed can be made without departing from the scope or spirit of this invention.

I claim:

In an apparatus for radiological logging of bore holes, a housing adapted to be lowered into a bore hole and having its axis parallel to said hole, a neutron source carried in said housing and arranged to radiate neutrons into the formations surrounding said bore hole, whereby gamma rays are emitted as a result of interaction of said neutrons with said formations, a first gamma-ray detector comprising a scintillating crystal and a photomultiplier operative to produce current pulses responsively to interaction of gamma rays with said crystal, a second gamma-ray detector comprising a plurality of scintillating crystals disposed around said first-mentioned crystal, the total volume of the crystals of said second detector being substantially equal to the volume of the crystal in said first detector and all of said crystals being disposed to define a plane substantially perpendicular to the axis of said housing, said second gamma-ray detector also comprising photomultiplier means for the crystals thereof operative to produce current impulses responsively to interaction of gamma rays with any of said crystals, gamma-ray-attenuating shielding means disposed between said first and second detectors in the plane of said detectors, additional shielding means, operative to attenuate both neutrons and gamma rays, disposed in said housing between said neutron source and said detectors, said neutron source being positioned in said housing at a point removed in the axial direction from the plane of said detectors, a first counting-rate circuit connected to said first detector operative to provide a uni-directional voltage proportional to the frequency of the current impulses produced therefrom, a second counting-rate circuit connected to said second detector operative to produce a uni-directional voltage responsively to the impulses produced by said second detector, means for connecting said uni-directional voltages in opposition to produce a resultant voltage representing the difference of said voltages, means for determining the depth of said housing, and means for recording said resultant voltage as a function of housing depth.

References Cited in the file of this patent

UNITED STATES PATENTS

| | | |
|---|---|---|
| 2,316,361 | Piety | Apr. 13, 1943 |
| 2,349,753 | Pontecorvo | May 23, 1944 |
| 2,383,478 | Friedman et al. | Aug. 28, 1945 |
| 2,443,731 | Herzog et al. | June 22, 1948 |
| 2,513,805 | Kanne | July 4, 1950 |

OTHER REFERENCES

"Instrumentation for Radioactivity," Pieper, Science, vol. 112, October 6, 1950, pp. 377–380.

"Geiger Counter Tubes," Friedman, Proceedings of the I. R. E., July 1949, vol. 37, #7, p. 807.